(12) United States Patent
Kim et al.

(10) Patent No.: US 9,137,845 B2
(45) Date of Patent: Sep. 15, 2015

(54) METHOD FOR TRANSMITTING A SIGNAL RELATED TO A CHANGE IN TRANSMISSION FORMAT

(75) Inventors: Hak Seong Kim, Anyang-si (KR); Han Byul Seo, Anyang-si (KR); Byoung Hoon Kim, Anyang-si (KR); Ki Jun Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 184 days.

(21) Appl. No.: 13/817,788

(22) PCT Filed: Aug. 19, 2011

(86) PCT No.: PCT/KR2011/006145
§ 371 (c)(1),
(2), (4) Date: Feb. 19, 2013

(87) PCT Pub. No.: WO2012/023835
PCT Pub. Date: Feb. 23, 2012

(65) Prior Publication Data
US 2013/0142111 A1    Jun. 6, 2013

Related U.S. Application Data

(60) Provisional application No. 61/375,298, filed on Aug. 20, 2010.

(51) Int. Cl.
| | | |
|---|---|---|
| H04B 7/14 | (2006.01) | |
| H04W 76/04 | (2009.01) | |
| H04L 1/00 | (2006.01) | |
| H04L 1/18 | (2006.01) | |
| H04W 4/00 | (2009.01) | |
| H04W 84/04 | (2009.01) | |
| H04L 1/08 | (2006.01) | |
| H04B 7/155 | (2006.01) | |

(52) U.S. Cl.
CPC ........... *H04W 76/046* (2013.01); *H04L 1/0038* (2013.01); *H04L 1/189* (2013.01); *H04B 7/15528* (2013.01); *H04L 1/08* (2013.01); *H04W 84/047* (2013.01)

(58) Field of Classification Search
None
See application file for complete search history.

(56) References Cited

U.S. PATENT DOCUMENTS

2009/0290528 A1* 11/2009 Kwon et al. ................... 370/315
2010/0182952 A1*  7/2010 Jeong et al. .................... 370/328

FOREIGN PATENT DOCUMENTS

| KR | 100903053 | 6/2009 |
| KR | 1020100073970 | 7/2010 |
| KR | 1020100081693 | 7/2010 |

*Primary Examiner* — Ayaz Sheikh
*Assistant Examiner* — Sori Aga
(74) *Attorney, Agent, or Firm* — Lee, Hong, Degerman, Kang & Waimey

(57) ABSTRACT

Provided is a method of transmitting a signal related to a change in a transmission format. In a wireless communication system which uses an orthogonal frequency division multiplexing (OFDM) symbol or a single carrier-frequency division multiple access (SC-FDMA) symbol, the method includes: transmitting, from a base station to a receiver, a radio resource control (RRC) message indicating that a first transmission format is changed to a second transmission format; and if an acknowledgement (ACK) message for the RRC message is not received, repetitively transmitting the RRC message, from the base station to the receiver, together with data based on the first transmission format or data based on the second transmission format, wherein the data based on the first transmission format and the data based on the second transmission format transmitted together with the RRC message are alternately selected.

4 Claims, 13 Drawing Sheets

METHOD FOR TRANSMITTING A SIGNAL RELATED TO A CHANGE IN TRANSMISSION FORMAT

CROSS-REFERENCE TO RELATED APPLICATIONS

This application is the National Stage filing under 35 U.S.C. 371 of International Application No. PCT/KR2011/006145, filed on Aug. 19, 2011, which claims the benefit of U.S. Provisional Application Ser. No. 61/375,298, filed on Aug. 20, 2010, the contents of which are all hereby incorporated by reference herein in their entirety.

TECHNICAL FIELD

The present invention relates to a communication technique, and more particularly, to a transmitter and a receiver in a wireless communication system.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims to support an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A relay station technology is one of main technologies for the LTE-advanced.

A relay station is a device for relaying a signal between a base station and a user equipment, and is used for cell coverage extension and throughput enhancement of a wireless communication system.

A transmission format such as a transmission mode of a downlink channel is used for communication between the relay station and the base station. A communication connection cannot be maintained when information regarding the transmission format is not correctly delivered to the relay station, the base station, the user equipment, or the like. Therefore, there is a need for a communication method for correctly delivering the transmission format by considering an operation characteristic of the relay station, the base station, and the user equipment.

SUMMARY OF INVENTION

Technical Problem

The present invention provides a method of transmitting a signal related to a change in a transmission format.

Technical Solution

According to an aspect of the present invention, there is provided a method of transmitting a signal related to a change in a transmission format. Specifically, in a wireless communication system which uses an orthogonal frequency division multiplexing (OFDM) symbol or a single carrier-frequency division multiple access (SC-FDMA) symbol, the method includes: transmitting, from a base station to a receiver, a radio resource control (RRC) message indicating that a first transmission format is changed to a second transmission format; and if an acknowledgement (ACK) message for the RRC message is not received, repetitively transmitting the RRC message, from the base station to the receiver, together with data based on the first transmission format or data based on the second transmission format. The data based on the first transmission format and the data based on the second transmission format repetitively transmitted together with the RRC message may be alternately selected.

Additionally or alternatively, the receiver may be a relay node. Additionally or alternatively, the transmission format may include bitmap information related to a backhaul subframe assignment. Additionally or alternatively, any one of a plurality of backhaul subframes indicated by the first transmission format may overlap with any one of a plurality of backhaul subframes indicated by the second transmission format.

Additionally or alternatively, the receiver may be a relay node. Additionally or alternatively, the transmission format may include bitmap information related to frequency resources indicating a relay-physical downlink control channel (R-PDCCH) search space. Additionally or alternatively, any one of a plurality of frequency resources indicated by the first transmission format may overlap with any one of a plurality of frequency resources indicated by the second transmission format.

Additionally or alternatively, the repetitively transmitting of the RRC message may be performed when the ACK message for the RRC message is not received before a first timer of the base station expires.

Additionally or alternatively, the repetitively transmitting of the RRC message may be performed until a second timer of the base station expires.

Additionally or alternatively, the data based on the second transmission format may be first transmitted, and then the data based on the first transmission format may be transmitted.

Additionally or alternatively, the data based on the first transmission format and the data based on the second transmission format may be alternately selected according to a pre-set pattern.

Additionally or alternatively, the transmission format may be related to any one of a transmission mode of a downlink channel, a backhaul subframe assignment, an R-PDCCH search space, an R-PDCCH demodulation reference signal (DMRS) configuration, and a backhaul timing configuration.

Additionally or alternatively, the receiver may be a relay node or a user equipment.

Additionally or alternatively, the method may further include, upon receiving the ACK message for the RRC message, transmitting a response message for the ACK message.

Additionally or alternatively, the RRC message may be an RRC connection reconfiguration message.

According to another aspect of the present invention, there is provided a base station using an OFDM symbol or a SC-FDMA symbol. The base station includes a radio frequency (RF) unit configured for: transmitting, to a receiver, an RRC message indicating that a first transmission format is changed to a second transmission format; and if an ACK message for the RRC message is not received, repetitively transmitting the RRC message, from the base station to the receiver, together with data based on the first transmission format or data based on the second transmission format. The data based on the first transmission format and the data based on the second transmission format transmitted together with the RRC message may be alternately selected.

Advantageous Effects

According to the present invention, information on a changed transmission format can be used in a transmitting side and a receiving side. Therefore, performance can be improved.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. Although 3GPP LTE/LET-A is exemplified in the following description for clarity of explanation, technical features of the present invention are not limited thereto.

Figure 1:
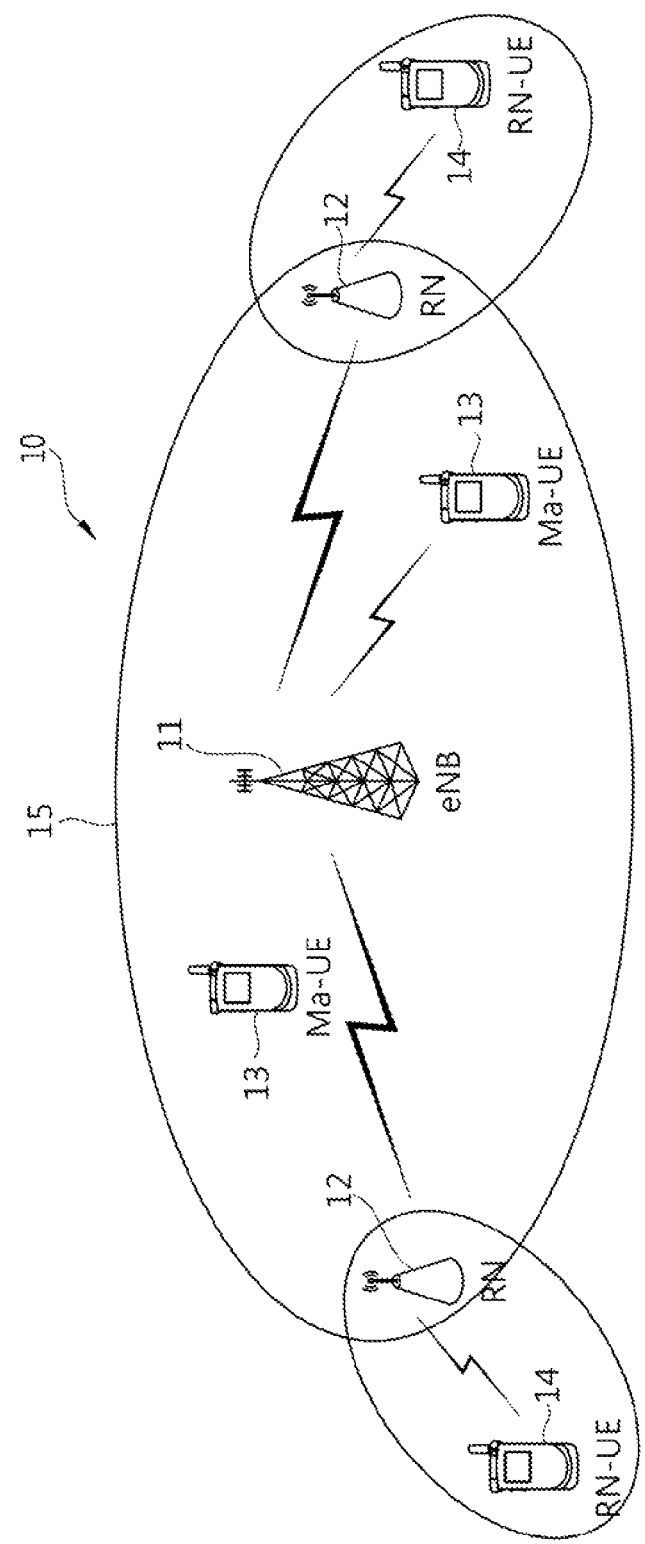
FIG. 1 shows a wireless communication system employing a relay node (RN).

FIG. 1 shows a wireless communication system employing a relay node (RN).

Referring to FIG. 1, a wireless communication system 10 employing an RN 12 includes at least one eNodeB (eNB) 11. Each eNB 11 provides a communication service to a specific geographical region 15 generally referred to as a cell. The cell may be divided into a plurality of regions, and each region may be referred to as a sector. One or more cells may exist in the coverage of one eNB. The eNB 11 is generally a fixed station that communicates with a user equipment (UE) 13 and may be referred to as another terminology, such as a base station (BS), a base transceiver system (BTS), an access point, an access network (AN), etc. The eNB 11 may perform functions such as connectivity between the RN 12 and a UE 14, management, control, resource allocation, etc.

The RN 12 is a device for relaying a signal between the eNB 11 and the UE 14, and is also referred to as another terminology such as a relay station (RS), a repeater, a relay, etc. A relay scheme used in the RN may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro-UE (Ma-UE) 13 denotes a UE which communicates directly with the eNB 11, and a relay node-UE (RN-UE) 14 denotes a UE which communicates with the RN. To improve a data transfer rate depending on a diversity effect, the Ma-UE 13 located in the cell of the eNB 11 can also communicate with the eNB 11 via the RN 12.

A link between the eNB 11 and the Ma-UE 13 may be called a macro link. The macro link may be divided into a macro downlink (M-DL) and a macro uplink (M-UL). The M-DL denotes communication from the eNB 11 to the Ma-UE 13. The M-UL denotes communication from the Ma-UE 13 to the eNB 11.

A link between the eNB 11 and the RN 12 may be called a backhaul link. The backhaul link may be divided into a backhaul downlink (B-DL) and a backhaul uplink (B-UL). The B-DL denotes communication from the eNB 11 to the RN 12. The B-UL denotes communication from the RN 12 to the eNB 11.

A link between the RN 12 and the RN-UE 14 may be called an access link. The access link may be divided into an access downlink (A-DL) and an access uplink (A-UL). The A-DL denotes communication from the RN 12 to the RN-UE 14. The A-UL denotes communication from the RN-UE 14 to the RN 12.

The wireless communication system 10 employing the RN is a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources.

Figure 2:
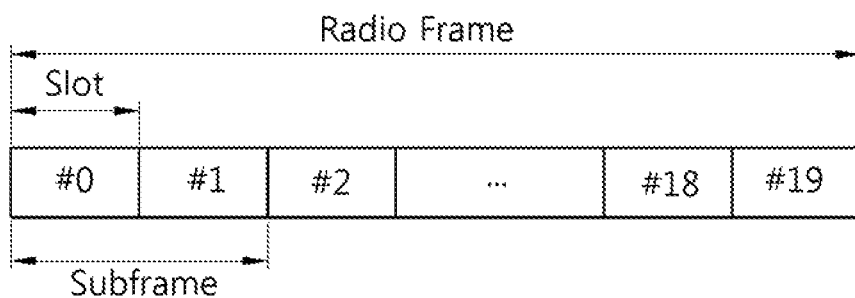
FIG. 2 shows a radio frame structure of $3^{rd}$ generation partnership project (3GPP) long term evolution (LTE).

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol period, and may be referred to as other terms. For example, the OFDM symbol may also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0 (2008-12), one subframe includes 7 OFDM symbols in case of a normal CP, and includes 6 OFDM symbols in case of an extended CP. The radio frame structure is for exemplary purposes only, and thus the number of subframes included in the radio frame and the number of slots included in the subframe may change variously.

The radio frame structure of FIG. 2 may be found in the sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

Figure 3:
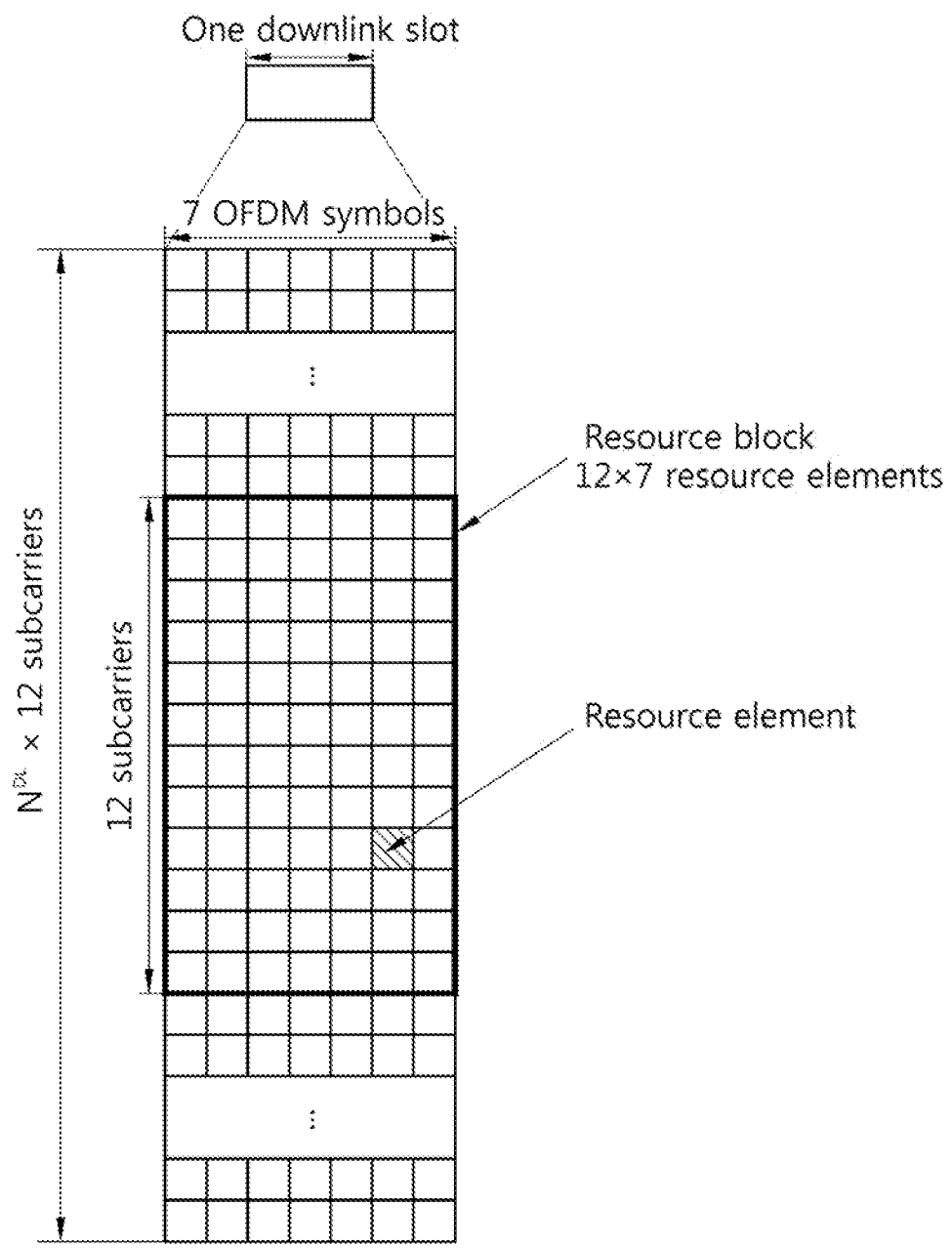
FIG. 3 shows an example of a resource grid for one downlink (DL) slot.

FIG. 3 shows an example of a resource grid for one DL slot.

In FDD and TDD radio frames, one slot includes a plurality of orthogonal frequency division multiplexing (OFDM) symbols in a time domain and a plurality of resource blocks (RBs) in a frequency domain. Hereinafter, a symbol may imply one OFDM symbol or one SC-FDMA symbol. The RB is a unit of resource allocation, and includes a plurality of consecutive subcarriers in one slot.

Referring to FIG. 3, a slot (e.g., a DL slot included in a DL subframe) includes a plurality of OFDM symbols in a time domain. It is described herein that one DL slot includes 7 OFDMA symbols and one RB includes 12 subcarriers in a frequency domain for exemplary purposes only, and thus the present invention is not limited thereto. In the RB, a subcarrier may have a spacing of 15 kHz, for example.

Each element on the resource grid is referred to as a resource element (RE), and one RB includes 12×7 REs. The number $N^{DL}$ of RBs included in the DL slot depends on a DL transmission bandwidth determined in a cell. The aforementioned resource grid described in FIG. 3 is also applicable to a UL slot.

Figure 4:
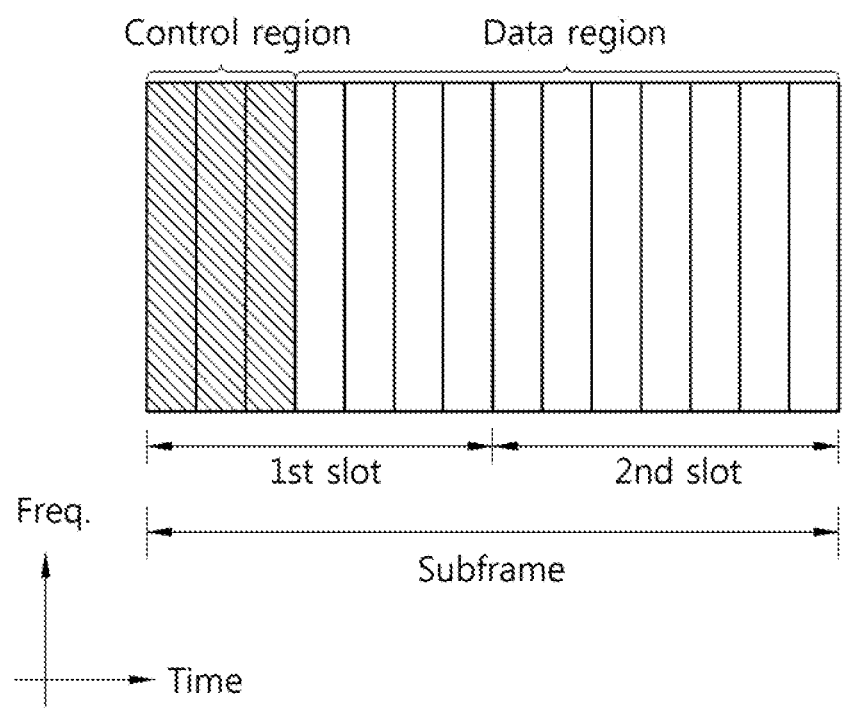
FIG. 4 shows a DL subframe structure between an eNodeB (eNB) and a user equipment (UE).

FIG. 4 shows a DL subframe structure between an eNB and a UE.

Referring to FIG. 4, a subframe includes two consecutive slots. In the subframe, up to three preceding OFDM symbols of a $1^{st}$ slot correspond to a control region to which a physical downlink control channel (PDCCH) is allocated, and the remaining OFDM symbols correspond to a data region to which a physical downlink shared channel (PDSCH) is allocated. A control channel such as a physical control format indicator channel (PCFICH), a physical hybrid-ARQ indicator channel (PHICH), etc., may be allocated to the control region in addition to the PDCCH. The UE may read data information transmitted through the PDSCH by decoding control information transmitted through the PDCCH.

The number of OFDM symbols to which the PDCCH is allocated is variable. In addition, additional control information may be included in the data region to which the PDSCH is allocated.

The control region consists of a plurality of control channel elements (CCEs), i.e., a logical CCE stream. The CCE stream denotes a set of all CCEs constituting the control region in one subframe. The CCE corresponds to a plurality of resource element groups (REGs). For example, the CCE may correspond to 9 REGs. The REG is used to define mapping of a control channel to a resource element. For example, one REG may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. The number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be an element of $\{1, 2, 4, 8\}$.

Control information transmitted through the PDCCH is referred to as downlink control information (DCI). The DCI includes uplink scheduling information (i.e., an uplink grant), downlink scheduling information (i.e., a downlink grant), system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 5:
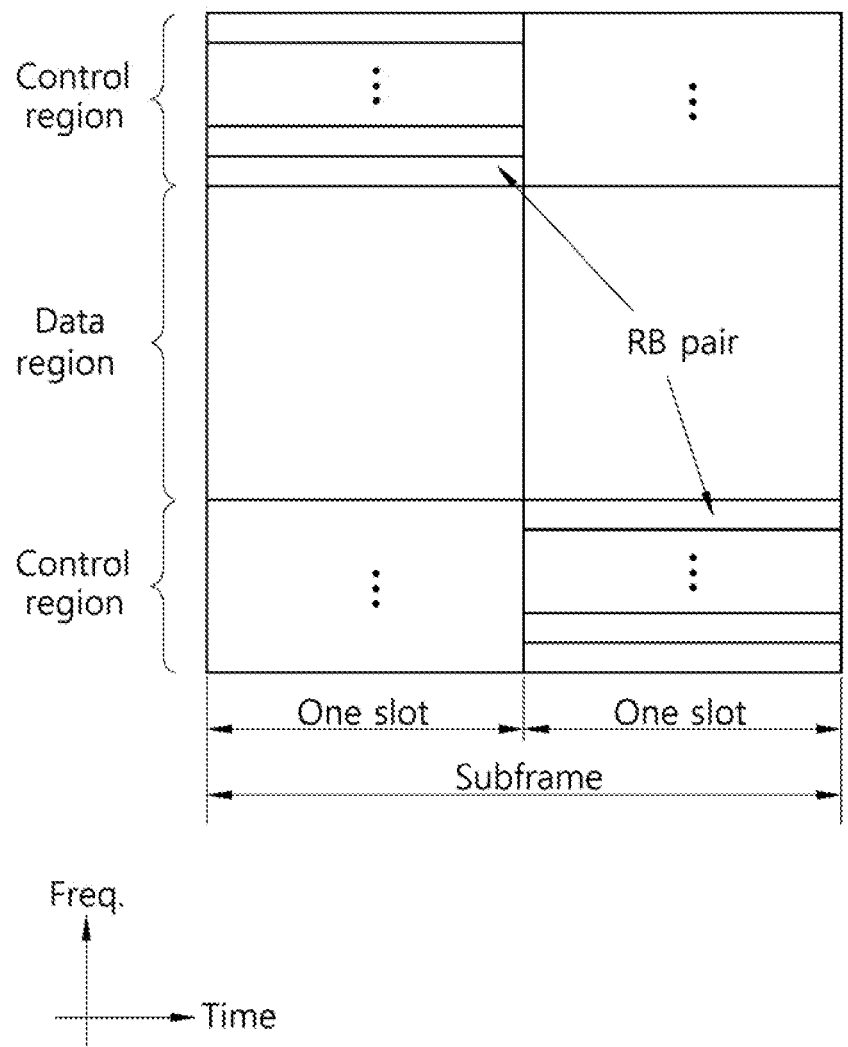
FIG. 5 shows an uplink (UL) subframe structure between an eNB and a UE.

FIG. 5 shows a UL subframe structure between an eNB and a UE.

Referring to FIG. 5, a UL subframe may be divided into a control region and a data region. The control region is a region to which a physical uplink control channel (PUCCH) for carrying UL control information is allocated. The data region is a region to which a physical uplink shared channel (PUSCH) for carrying user data is allocated.

The PUCCH for one UE is allocated in a pair of RBs. The RBs belonging to the RB pair occupy different subcarriers in each of two slots. This is called that the RB pair allocated to the PUCCH is frequency-hopped in a slot boundary.

The PUCCH may support multiple formats. That is, UL control information having a different number of bits for each subframe may be transmitted according to a modulation scheme. For example, when using a binary phase shift keying (BPSK) (i.e., a PUCCH format 1a), 1-bit UL control information may be transmitted through the PUCCH, and when using quadrature phase shift keying (QPSK) (i.e., a PUCCH format 1b), 2-bit UL control information may be transmitted through the PUCCH. In addition thereto, examples of the PUCCH format include a format 1, a format 2, a format 2a, a format 2b, etc. This may be found in the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)".

Figure 6:
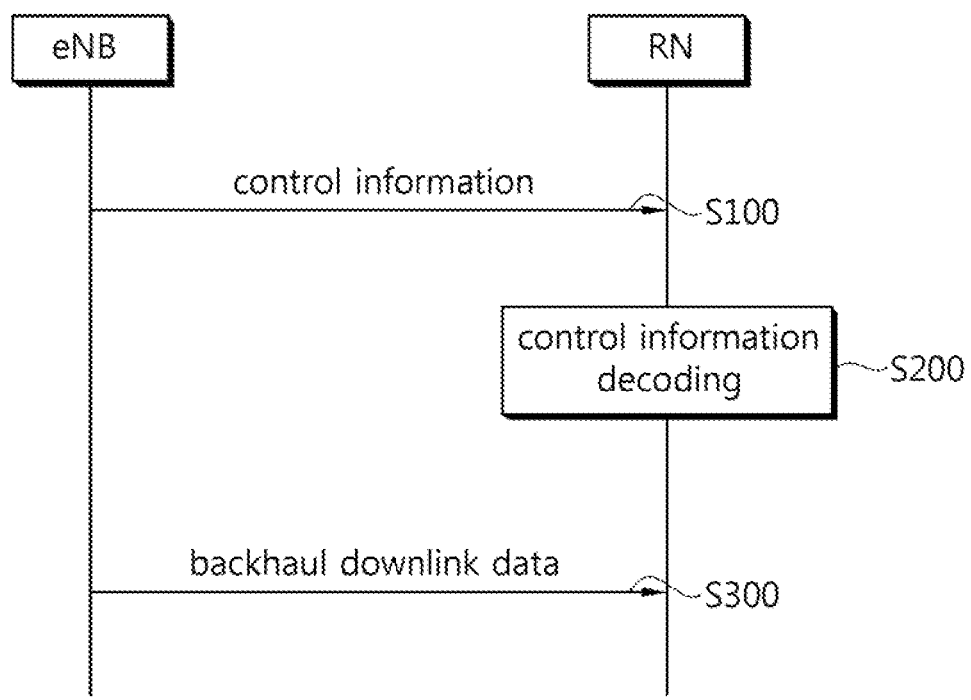
FIG. 6 shows an exemplary method of transmitting a backhaul downlink signal.

FIG. 6 shows an exemplary method of transmitting a backhaul downlink signal.

An eNB transmits control information to an RN (step S100). The control information may include information regarding a resource for transmitting backhaul downlink data. The control information may be transmitted by using a higher layer signal such as radio resource control (RRC) signaling, or may be transmitted by using a physical layer signal. Resource allocation information regarding an additional control signal to be transmitted at a later time may be included in the control information.

The RN decodes the control information (step S200). By decoding the control information, the RN can know information related to a radio resource for transmitting the backhaul downlink data.

The eNB transmits the backhaul downlink data (step S300). In this case, the backhaul downlink data may be transmitted through a radio resource indicated by the control information.

Hereinafter, an exemplary method of transmitting control information from an eNB to an RN will be described. The control information may include information regarding a transmission format.

The information regarding the transmission format may be transmitted through RRC signaling. The information regarding the transmission format may include at least one of information regarding a transmission mode, information regarding a backhaul subframe assignment, information regarding an R-PDCCH search space, information regarding an R-PDCCH demodulation reference signal (DMRS), and information regarding a backhaul timing configuration.

Hereinafter, the information regarding the transmission mode will be described. The transmission mode is used to determine the aforementioned DCI format. Specifically, in case of using a cell radio network temporary identifier (C-RNTI), 7 modes are supported from a transmission mode 1 to a transmission mode 7. Each transmission mode supports two types of DCI format. That is, the two types of DCI format can be known when the C-RNTI and the information regarding the transmission mode are acquired. One of the two types of DCI format for a specific transmission mode may be used as a fallback mode. Specifically, a DCI format 1A which exists commonly in the 7 modes may be used as the fallback mode.

Hereinafter, the information regarding the backhaul subframe assignment will be described. As described above, the backhaul link denotes the link between the eNB and the RN. Since not all subframes are used for the backhaul, information indicating which subframe is used for the backhaul is included in the information regarding the backhaul subframe assignment. The information regarding the backhaul subframe assignment may be delivered in a bitmap format through RRC signaling.

Hereinafter, the R-PDCCH will be described. A PDCCH transmitted by the eNB may be divided into an eNB-PDCCH (or Macro-PDCCH) and an R-PDCCH (or RN-PDCCH). The eNB-PDCCH is a PDCCH transmitted from the eNB to the UE, and is a typical PDCCH. The R-PDCCH is a PDCCH transmitted from the eNB to the RN. The PDCCH is transmitted through a specific number of OFDM symbols indicated by a PCFICH, and a PDSCH is transmitted in the remaining regions. However, the R-PDCCH may be included in the conventional PDSCH region.

Hereinafter, the R-PDCCH search space will be described. As described above, an R-PDCCH is a control channel for transmitting backhaul downlink control information from the eNB to the RN. The R-PDCCH may also be called a relay node-PDCCH (RN-PDCCH). A structure or operation related to the R-PDCCH may differ from that of the aforementioned eNB-PDCCH. An R-PDSCH is a data channel for transmitting backhaul downlink data from the eNB to the RN. The R-PDCCH search space is a radio resource region for transmitting the R-PDCCH. Blind decoding is conventionally used to decode the PDCCH. However, in case of decoding the R-PDCCH, the R-PDCCH search space is designated through RRC signaling. Therefore, it is important to normally receive an RRC message to decode the R-PDCCH.

Hereinafter, the information regarding the R-PDCCH DMRS configuration will be described. The information regarding the R-PDCCH DMRS configuration is information indicating whether to use the conventional cell-specific reference signal (CRS) or a DMRS to decode the R-PDCCH.

Hereinafter, the information regarding the backhaul timing configuration will be described. The information regarding the backhaul timing configuration is information required to decode the R-PDCCH and the R-PDSCH, and may include information regarding a location at which the R-PDSCH starts.

Figure 7:
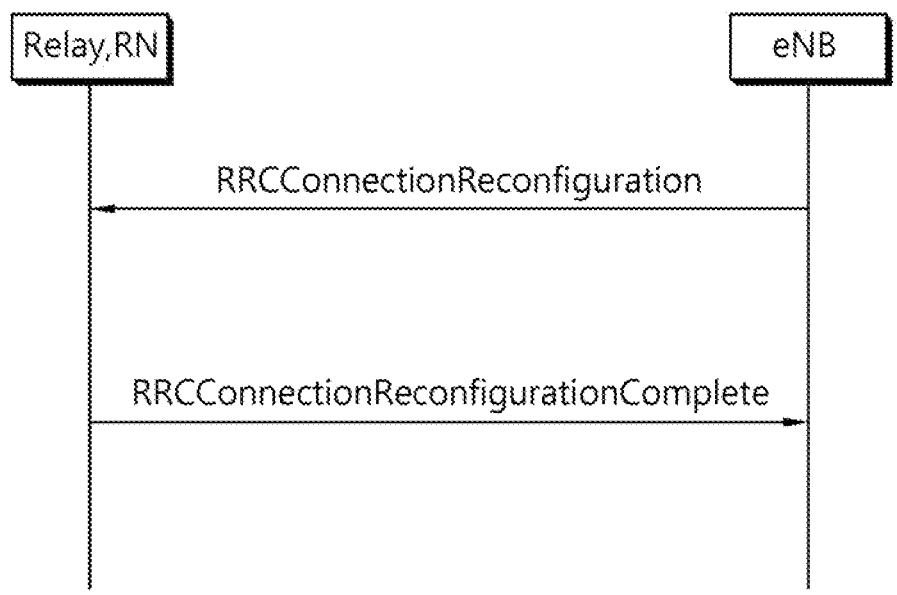
FIG. 7 shows an example of radio resource control (RRC) signaling.
Figure 8:
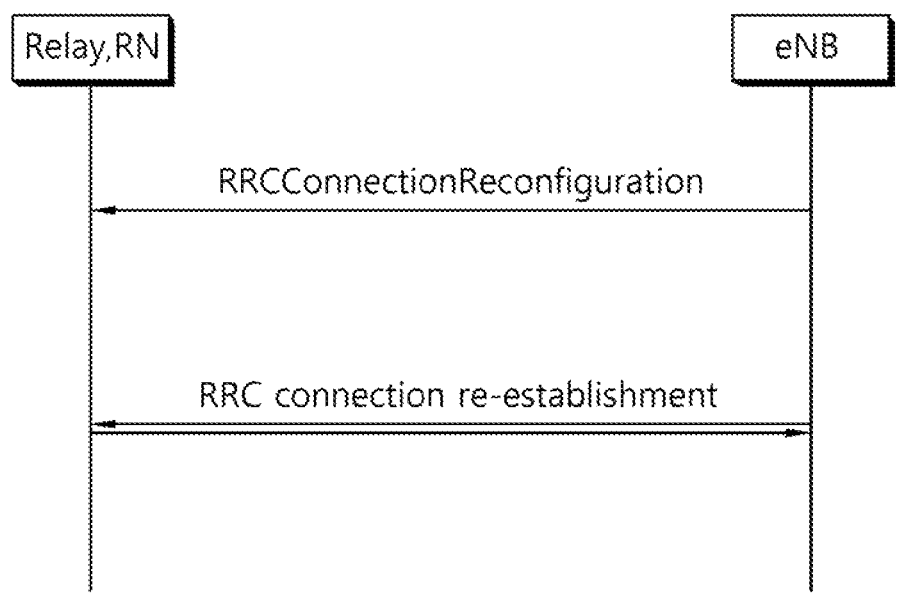
FIG. 8 shows an example of RRC signaling.

FIG. 7 and FIG. 8 show examples of RRC signaling. Referring to FIG. 7, an eNB transmits an RRC connection reconfiguration message to an RN, and if a reconfiguration is successful, the RN transmits an RRC connection reconfiguration complete message to the eNB. That is, a reconfiguration success case is shown in FIG. 7, and a reconfiguration failure case is shown in FIG. 8. In case of FIG. 8, the eNB and the RN start an RRC connection re-establishment procedure.

Signaling for the RRC connection reconfiguration shown in FIG. 7 and FIG. 8 can be used only when the aforementioned transmission format is changed. That is, as described above, the RRC connection reconfiguration signal can be used when there is a change in the information regarding the transmission mode related to the DCI format, the information regarding the backhaul subframe assignment, the information regarding the R-PDCCH search space, the information regarding the R-PDCCH DMRS configuration, and the information regarding the backhaul timing configuration.

Figure 9:
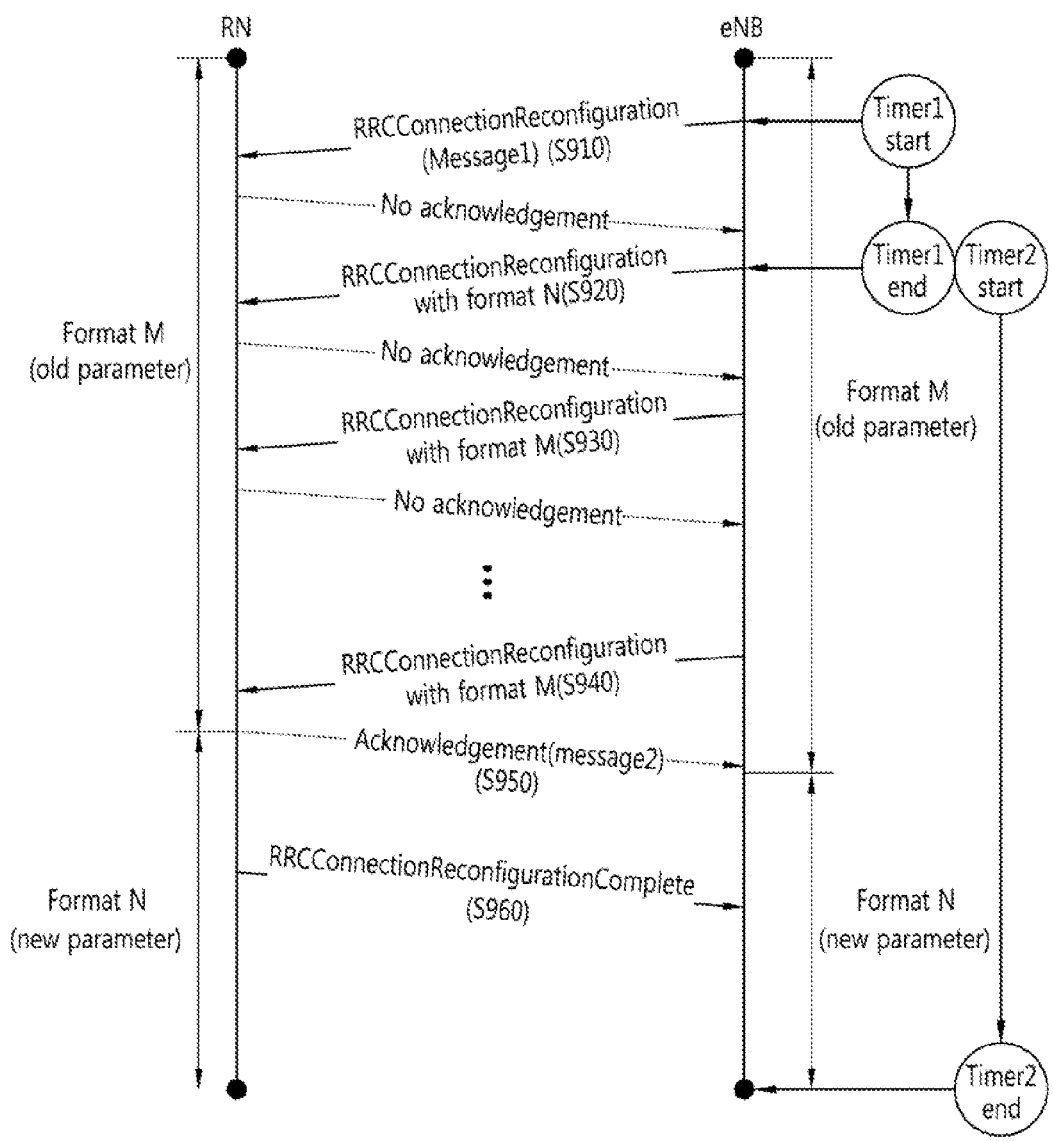
FIG. 9 shows an exemplary method of reconfiguring an RRC connection to change a transmission format.

FIG. 9 shows an exemplary method of reconfiguring an RRC connection to change a transmission format. The example of FIG. 9 is applicable to communication between an eNB and an RN. In addition, the example of FIG. 9 is also applicable to communication between the eNB and a UE. Hereinafter, communication between the eNB and the RN will be described for convenience of explanation.

As illustrated, the eNB transmits an RRC message to the RN to notify that a first transmission format is changed to a second transmission format (step S910). An RRC connection reconfiguration message may be an example of the RRC message. Upon receiving the RRC message, the RN transmits acknowledgement (ACK) message to the eNB. If the ACK message is not received by the eNB, the RRC message is transmitted together with data based on the second transmission format (step S920). After performing the operation of step S920, if the ACK message is not received by the eNB, the RRC message is transmitted together with data based on the first transmission format (step S930). As illustrated, steps S920 and S930 may be repetitively performed. In addition, the steps S920 and S930 may be alternately performed. If the ACK message is transmitted to the eNB in response to the RRC message of step S910, the eNB and the RN perform communication by changing the transmission format.

More specifically, as shown in FIG. 9, the eNB transmits an RRCConnectionReconfiguration message to the RN. The RRCConnectionReconfiguration message may indicate that the first transmission format is changed to the second transmission format. For example, a specific bit of the RRCConnectionReconfiguration message may be used to indicate a change in the transmission format. Alternatively, a bit indicating the second transmission format may be used to indicate that the second transmission format will be used. In FIG. 9, the first transmission format is denoted by a 'Format M', and the second transmission format is denoted by a 'Format N'.

Meanwhile, as described above, the transmission format may indicate the information regarding the transmission mode related to the DCI format, the information regarding the backhaul subframe assignment, the information regarding the R-PDCCH search space, the information regarding the R-PDCCH DMRS, and the information regarding the backhaul timing configuration.

The RRCConnectionReconfiguration message operates as a 'Message 1'. Therefore, upon successfully receiving the Message 1, the RN transmits a 'Message 2' to the eNB. That is, the RN transmits an ACK message to the eNB (step S950). When the RN receives the 'Message 2', the RN uses the first transmission format. Meanwhile, the eNB uses the second transmission format from a time when the 'Message 2' is received.

Unlike the example of FIG. 9, if only the 'Message 1' and the 'Message 2' are used without an additional message, there may be a problem caused by an ambiguity duration. Specifically, since a time delay occurs until the 'Message 2' transmitted from the RN is received by the eNB, a time of using the second transmission format in the RN differs from a time of using the second transmission format in the eNB. That is, the ambiguity duration is a duration from a time when the RN transmits the 'Message 2' to a time when the eNB receives the 'Message 2'. A link between the eNB and the RN may be disconnected due to the ambiguity duration. The example of FIG. 9 is for solving such a problem of the ambiguity duration.

Specifically, if the eNB fails to receive the 'Message 2', the eNB retransmits the 'Message 1'. In this case, data based on the second transmission format is also transmitted together. For example, if the transmission format is the information regarding the transmission mode related to the DCI format, the 'Message 2' is transmitted together with data generated based on a new DCI format. For example, if the transmission format is the information regarding the backhaul subframe assignment, the 'Message 2' is transmitted together with data generated based on a new backhaul subframe assignment. In this case, a new format (i.e., the second transmission format) and an old format (i.e., the first transmission format) are alternately selected. In addition, the new format and the old format may be repetitively selected. That is, if the eNB fails to receive the 'Message 2' after transmitting the 'Message 1', the transmission format may be alternately and repetitively used in a pattern of the second transmission format-->the first transmission format-->the second transmission format-->the first transmission format. The alternate selection method may be various. For example, similarly to steps S920 to S940 of FIG. 9, it may be repeated in a pattern of the second transmission format-->the first transmission format-->the second transmission format-->the first transmission format. In addition, it is also possible to use a pattern in which the second transmission format is used more frequently than the first transmission format or a pattern in which the first transmission format is used more frequently than the second transmission format. An operation of alternately selecting the first transmission format and the second transmission format according to a specific pattern may be repeated until the 'Message 2' is successfully received by the eNB. The operation of alternately selecting the transmission format according to the pattern may be performed in a unit of subframes. That is, it is possible to perform an operation in which the second transmission format is used in a first subframe and thereafter the first transmission format is used in a second subframe.

As such, if the first transmission format and the second transmission format are alternately selected, a success and a failure are repeated when decoding is performed in the RN even if the eNB and the RN use different transmission formats. That is, if only any one of the first transmission format and the second transmission format is used, decoding fails persistently in the RN, and thus there is a problem in that a link between the eNB and the RN is disconnected. The problem of the persistent decoding failure is solved when the transmission format is alternately repeated.

The eNB may use at least one timer. That is, the eNB may start a first timer while transmitting the 'Message 1', and if the 'Message 2' is not received before the first timer expires, the aforementioned steps S920 to S940 may be performed. In addition, if the first timer expires, the eNB may start a second timer. In this case, the aforementioned steps S920 to S940 may be performed until the second timer expires. The aforementioned timers 1 and 2 may be implemented as separate entities, or may be implemented as one entity so as to be run by using the same value.

Instead of the second timer, a retry counter may be used for the first transmission format and the second transmission format. That is, the number of times of using the first transmission format and the number of times of using the second transmission format may be defined as the retry counter. In this case, the retry counter may be incremented by one when the first transmission format and the second transmission format are transmitted alternately according to a specific pattern. That is, in case of using a pattern of the second transmission format-->the first transmission format-->the second transmission format-->the first transmission format, the retry counter may be incremented by one when using a pattern of the second transmission format-->the first transmission format.

The retry counter may be used in an increment or decrement manner. In this case, the aforementioned steps S920 to S940 may be performed until the retry counter reaches a pre-set value. If the retry counter is used, a repetition count may be determined according to information included in the transmission format. For example, if the transmission format includes the information of the transmission mode related to the DCI format, the repetition count may be set to 2 since one transmission mode includes two DCI formats.

In addition to the aforementioned method, it is proposed a method of solving a problem occurring when the eNB fails to receive the 'Message 2' transmitted in step S950. If the eNB fails to receive the 'Message 2', a decoding error for a control channel occurs in the RN since the RN uses the new transmission format whereas the eNB uses the old transmission format.

If the RN transmits the 'Message 2' and then fails to receive an ACK message (i.e., 'Message 3') from the eNB in response to the 'Message 2' until the timer expires, the RN assumes that the 'Message 2' is not received by the eNB. In addition, the RN performs decoding by using the old transmission format instead of the new transmission format. In this case, the eNB preferably knows that the RN performs the aforementioned operation. If it fails to receive the ACK message (i.e., 'Message 3') in response to the 'Message 2', the eNB uses the old transmission format since the eNB knows that the RN uses the old transmission format.

In order to perform the aforementioned operation, if the 'Message 2' is successfully received, the eNB uses the new transmission format before expiration of a third timer which is set by the eNB. This is to avoid a case in which the RN uses the old transmission format even if the eNB successfully receives the 'Message 2'. The third timer is preferably set to its minimum value (i.e., a time at which a signal is transmitted to the RN after the eNB receives the 'Message 2'). The aforementioned timers 1, 2, and 3 may be implemented as separate entities, or may be implemented as one entity so as to be run by using the same value.

In addition to the aforementioned method, it is proposed a method of using a fallback mode of the transmission format. If the transmission format is the information regarding the transmission mode related to the DCI format, the fallback mode is pre-set in each transmission mode. For example, if another DCI format is included in one transmission mode together with a DCI format 1A determined to the fallback mode, it is possible to use the fallback mode in the example of FIG. 9. That is, in a process of transmitting and receiving the RRCConnectionReconfiguration message, the eNB and the RN can always use the fallback mode.

In addition to the aforementioned method, a method in which the new transmission format is not used when the RN transmits the 'Message 2' is also possible. That is, when the RN transmits the 'Message 2', the new transmission format may be used after a specific time (e.g., a pre-set time) is over. That is, if the specific time is not over, the RN which transmits the 'Message 2' may use the old transmission format, and if the specific time is over, the RN may use the new transmission format.

According to the example of FIG. 9, the eNB transmits an ACK message, i.e., the 'Message 3' (not shown) upon receiving the 'Message 2'. The RN transmits an RRCConnectionReconfigurationComplete message (step S960), i.e., a 'Message 4', upon receiving the 'Message 3'. The Message 3 and the Message 4 may be used for other purposes. Specifically, the 'Message 3' and the 'Message 4' may additionally include information delivered from the eNB to the RN. That is, if the eNB successfully receives the 'Message 2', the 'Message 3' may notify a time of using the new format to the eNB together with a successful reception. The 'Message 3' may be implemented by using not a higher layer signal but a DL-grant. The 'Message 4' may be implemented by using not a higher layer signal but a UL-ACK/NACK for the DL-grant.

In addition to the aforementioned method, by fully using possible blind decoding capability in the RN, decoding may be performed based on the old transmission format in a first subframe, and decoding may be performed based on the new transmission format in a second subframe. In addition, it is also possible to perform blind decoding in a specific subframe by using both the old transmission format and the new transmission format. In case of using both of the two types of transmission format, the number of times of performing blind decoding applied to each format is decreased.

If the RN performs blind decoding by using the old transmission format and the new transmission format as described in the above method, the blind decoding may be performed according to a specific pattern or may be performed repetitively. Meanwhile, if the RN alternately selects the old transmission format and the new transmission format, the eNB may not alternately transmit the old transmission format (i.e., the first transmission format) and the new transmission format (i.e., the second transmission format). That is, since the transmission format for decoding is alternately selected in the RN, the aforementioned effect can be achieved even if the transmission format is not alternately selected in the eNB.

If at least two transmission formats are used, each transmission format preferably includes a common format, common information, or a common area. For example, if the transmission format includes bitmap information related to a backhaul subframe assignment, any one of a plurality of backhaul subframes indicated by the first transmission format preferably overlaps with (i.e., in common with) any one of a plurality of subframes indicated by the second transmission format.

Figure 10:
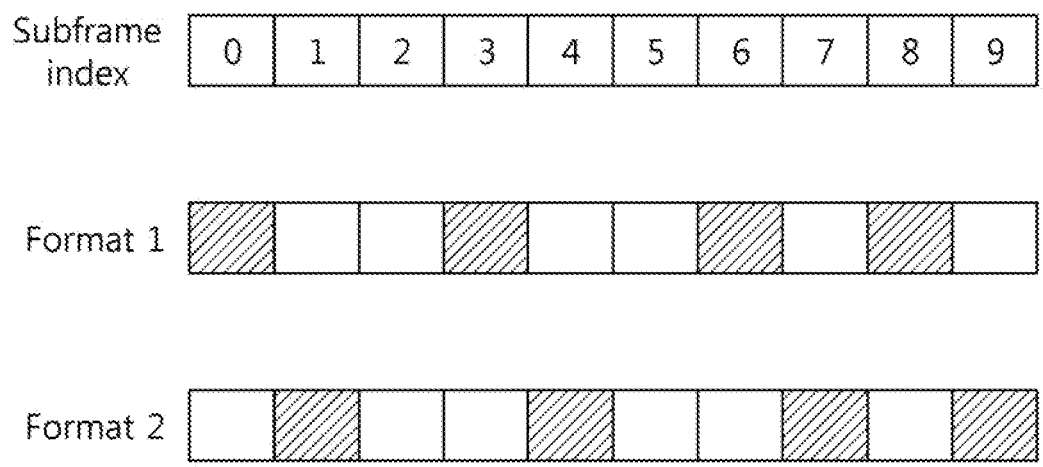
FIG. 10 shows an example in which common information is not included in different transmission formats.
Figure 11:
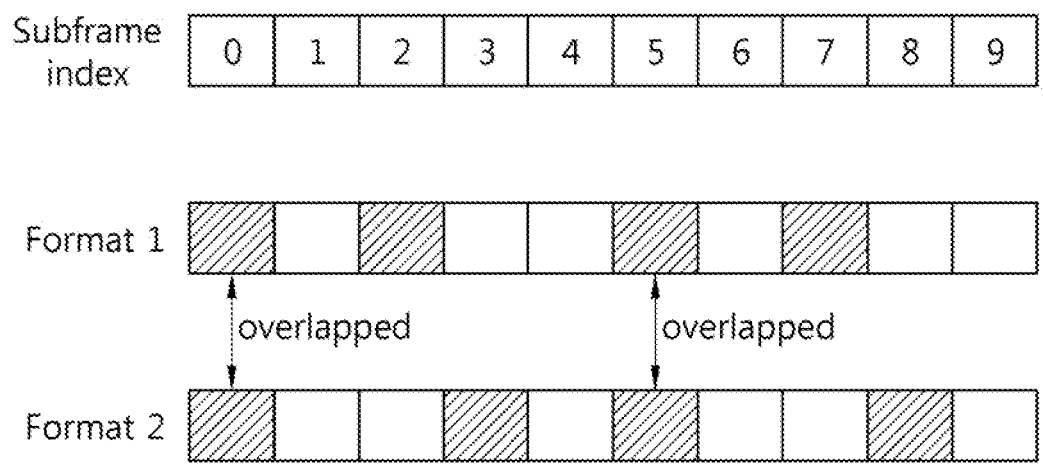
FIG. 11 shows an example in which common information is included in different transmission formats.

FIG. 10 shows an example in which common information is not included in different transmission formats. FIG. 11 shows an example in which common information is included in different transmission formats. As described above, the transmission format may include bitmap information related to a backhaul subframe assignment. That is, as shown in FIG. 10, a bitmap may be used to indicate subframes allocated to the backhaul subframe among subframes indexed from 0 to 9. For example, a 'Format 1' of FIG. 10 may be expressed by '1001001010' or its equivalent decimal number, and a 'Format 2' of FIG. 10 may be expressed by '0100100101' or its equivalent decimal number. The 'Format 1' of FIG. 10, i.e., the first transmission format, and the 'Format 2' of FIG. 10, i.e., the second transmission format, do not have a common area. In a case where there is no common area as shown in FIG. 10, if the 'Format 1' is used in the eNB and the 'Format 2' is used in the RN, there may be problem in that a link between the eNB and the RN is disconnected.

Therefore, if the transmission format includes the bitmap information related to the backhaul subframe assignment, each of transmission formats is preferably selected such that backhaul subframes belonging to different transmission formats temporally overlap with each other. That is, it is preferably determined such that the 'Format 1(1010010100)' and the 'Format 2(1001010010)' include the common area as shown in FIG. 11.

The aforementioned method is also applied when the transmission format includes bitmap information related to a frequency resource indicating an R-PDCCH search space. That is, the R-PDCCH search space is indicated by an index of a resource block (RB) which is searched for by the RN to decode the R-PDCCH. The index may be indicated in a bitmap format. In this case, any one of a plurality of frequency resources (i.e., an RB index) indicated by the first transmission format preferably overlaps with any one of a plurality of frequency resources (i.e., an RB index) indicated by the second transmission format. That is, an area indicated by the first transmission format and an area indicated by the second transmission format are preferentially in common with each other in a frequency domain. This is because, if the common area exists in the frequency domain, a link can be maintained continuously even if the eNB and the RN use different transmission formats.

As described above, if common information is included in a plurality of different transmission formats, the eNB and the RN may use one of the plurality of transmission formats when there is a problem in the link between the eNB and the RN. That is, by predetermining a transmission format to be used at the occurrence of the problem in the link between the eNB and the RN, the eNB and the RN may use the same transmission format without additional signaling when the link problem occurs.

In addition, if common information is included in the different transmission formats, the transmission format may be configured such that only a high aggregation level (e.g., 4, 8) is used instead of using all aggregation levels (i.e., 1, 2, 4, 8) when blind decoding is performed on the information. That is, if the common information is included in the different transmission formats, it is proposed to restrict the aggregation level such that it exists only in a part of a full search space when blind decoding is performed on a corresponding PDCCH. For example, if the transmission format indicates an R-PDCCH search space, a control channel element (CCE) aggregation level may be restricted by considering a static characteristic of the RN. That is, an overlapping area in the R-PDCCH search space may be configured such that it exists only in a search space of a high aggregation level (e.g., 4, 8).

The aforementioned method is also applicable to a link between the eNB and the UE, rather than the RN. For example, a PDCCH transmitted from the eNB to the UE may be transmitted through not a control region of a subframe (i.e., first three OFDM symbols in the subframe) but a data region. The PDCCH may be called in various terms such as an extended PDCCH (E-PDCCH). For such a PDCCH, a search space may be notified through RRC signaling. In this case, a part of a search space determined by the first transmission format preferably overlaps with a part of a search space determined by the second transmission format.

Although the example of FIG. 9 is applied when the transmission format is changed through RRC signaling, the aforementioned method is not limited thereto. Specifically, even if the transmission format is changed not through RRC signaling but through another signal, transmission can be performed by alternately selecting the first transmission format and the second transmission format as described above. In addition, even if the RRC signaling is not used, the first transmission format and the second transmission format may be determined to have a common area.

Figure 12:
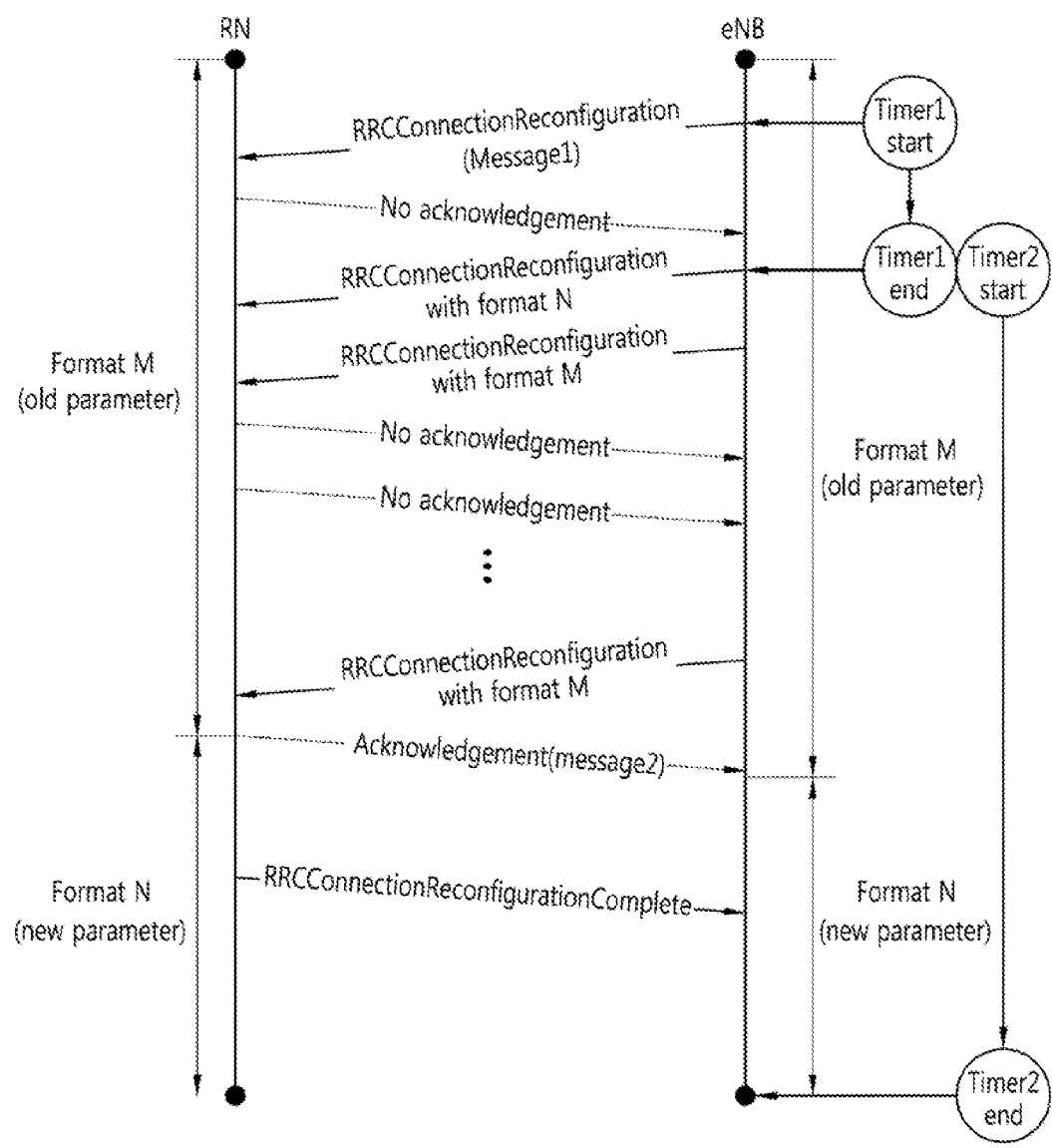
FIG. 12 shows an exemplary method of reconfiguring an RRC connection.

Meanwhile, the example of FIG. 9 relates to a method in which, when the eNB sends one message, a new message is transmitted after confirming that there is no ACK in response to the message. However, the aforementioned method is not limited thereto. Specifically, the method of FIG. 12 is also possible. That is, the eNB may repetitively transmit the new message before confirming that ACK is not received in response to a specific message.

Figure 13:
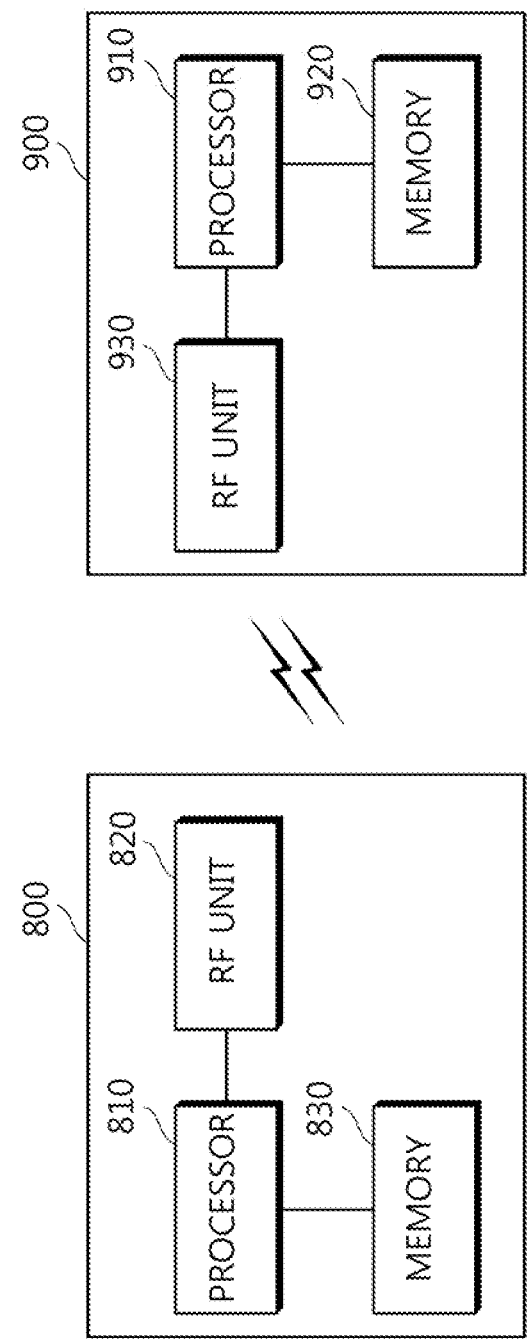
FIG. 13 shows an apparatus to which the aforementioned method is applied.

FIG. 13 shows an apparatus to which the aforementioned method is applied. A transmitter 800 of FIG. 13 includes a processor 810, a memory 830, and a radio frequency (RF) unit 820. The transmitter 800 may be an eNB, an RN, or a UE. The processor 810 can allocate a radio resource according to externally provided information, internally pre-stored information, etc. The processor 810 can implement procedures, methods, and functions performed by the transmitter in the aforementioned embodiments. The memory 830 is coupled to the processor 810, and stores a variety of information for driving the processor 810. The RF unit 820 is coupled to the processor 810 and transmits and/or receives a radio signal.

A receiver 900 which communicates with the transmitter includes a processor 910, a memory 920, and an RF unit 930. The transmitter 900 may be an eNB, an RN, or a UE. The processor 910 can implement procedures, methods, and functions performed by the transmitter in the aforementioned embodiments. The memory 920 is coupled to the processor 910, and stores a variety of information for driving the processor 910. The RF unit 930 is coupled to the processor 910 and transmits and/or receives a radio signal.

The processors 810 and 910 may include an application-specific integrated circuit (ASIC), a separate chipset, a logic circuit, and/or a data processing unit. The memories 830 and 920 may include a read-only memory (ROM), a random access memory (RAM), a flash memory, a memory card, a storage medium, and/or other equivalent storage devices. The RF units 820 and 930 may include a base-band circuit for processing a radio signal. When the embodiment of the present invention is implemented in software, the aforementioned methods can be implemented with a module (i.e., process, function, etc.) for performing the aforementioned functions. The module may be stored in the memories 830 and 920 and may be performed by the processors 810 and 910. The memories 830 and 920 may be located inside or outside the processors 810 and 910, and may be coupled to the processors 810 and 910 by using various well-known means.

The aforementioned method and apparatus can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a signal related to a change in a transmission format in a wireless communication system which uses an orthogonal frequency division multiplexing (OFDM) symbol or a single carrier-frequency division multiple access (SC-FDMA) symbol, the method comprising:

transmitting, from a base station to a relay station, a first control message including a radio resource control (RRC) message indicating that a first backhaul subframe assignment is changed to a second backhaul subframe assignment, wherein the first control message is transmitted based on at least one subframe indicated by the first backhaul subframe assignment;

starting a first timer upon transmitting the first control message;

determining whether an acknowledgement (ACK) message for the RRC message is received before the first timer expires;

if the ACK message for the RRC message is received before the first timer expires, communicating with the relay station based on at least one subframe indicated by the second backhaul subframe assignment;

if the ACK message for the RRC message is not received before the first timer expires, starting a second timer;

after starting the second timer, repetitively transmitting, from the base station to the relay station, at least one of the first control message including the RRC message and a second control message including the RRC message before the second timer expires, wherein the second control message is transmitted based on at least one subframe indicated by the second backhaul subframe assignment; and if the ACK message for the RRC message is received before the second timer expires, communicating with the relay station based on at least one subframe indicated by the second backhaul subframe assignment.

2. The method of claim 1, wherein the first backhaul subframe assignment includes a first bitmap indicating at least one subframe allocated for the first backhaul subframe assignment, and wherein the second backhaul subframe assignment includes a second bitmap indicating at least one subframe allocated for the second backhaul subframe assignment.

3. The method of claim 2, wherein at least one subframe indicated by the first bitmap is overlapped with at least one subframe indicated by the second bitmap.

4. A base station for transmitting a signal related to a change in a transmission format in a wireless communication system which uses an orthogonal frequency division multiplexing (OFDM) symbol or a single carrier-frequency division multiple access (SC-FDMA) symbol, comprising:
   a radio frequency (RF) unit configured to transmit and receive a signal; and
   a processor configured to:
      transmit, to a relay station, a first control message including a radio resource control (RRC) message indicating that a first backhaul subframe assignment is changed to a second backhaul subframe assignment,
      wherein the first control message is transmitted based on at least one subframe indicated by the first backhaul subframe assignment;
      start a first timer upon transmitting the first control message;
      determine whether an acknowledgement (ACK) message for the RRC message is received before the first timer expires;
      if the ACK message for the RRC message is received before the first timer expires, communicate with the relay station based on at least one subframe indicated by the second backhaul subframe assignment;
      if the ACK message for the RRC message is not received before the first timer expires, start a second timer;
      after starting the second timer, repetitively transmit, to the relay station, at least one of the first control message including the RRC message and a second control message including the RRC message before the second timer expires, wherein the second control message is transmitted based on at least one subframe indicated by the second backhaul subframe assignment; and
      if the ACK message for the RRC message is received before the second timer expires, communicating with the relay station based on at least one subframe indicated by the second backhaul subframe assignment.

* * * * *